April 15, 1941.  J. O. ALMEN  2,238,380

PRETWISTED TORSION PLATE SPRING

Filed Aug. 14, 1939  2 Sheets-Sheet 1

Inventor
John O. Almen
By Blackmore, Spencer & Clark
Attorneys

April 15, 1941.  J. O. ALMEN  2,238,380
PRETWISTED TORSION PLATE SPRING
Filed Aug. 14, 1939  2 Sheets-Sheet 2

Inventor
John O. Almen
By
Blackmore, Spencer & Hunt
Attorneys

Patented Apr. 15, 1941

2,238,380

UNITED STATES PATENT OFFICE 2,238,380

PRETWISTED TORSION PLATE SPRING

John O. Almen, Royal Oak, Mich., assignor to General Motors Corporation, Detroit, Mich., a corporation of Delaware Application August 14, 1939, Serial No. 290,141

19 Claims. (Cl. 267—57)

This invention relates to plate springs in torsion and to special forms and arrangements of such springs, adapted to a variety of uses.

When a flat plate is twisted, it becomes a helical surface. The longitudinal fibres are stretched lengthwise unequally, to an extent increasing with their distance from the axis of twisting. The longitudinal extension of those fibres a greater distance from the axis of twisting is resisted by those a lesser distance from the axis; and secondary tensile stresses arise which are a non-linear function of the twist angle, so that a flat plate in torsion inherently possesses a varying rate.

That is, the change in load required for successive equal increments of torsional deflection is a continually increasing one as the plate is twisted in either direction from its flat condition. Its load/deflection curve is a plain curve, rather than the straight line of a constant rate spring.

It has been found that when such a flat plate is pretwisted (i. e. initially twisted), so that it has a helical surface in its unstressed condition, it has a sinuous load/deflection curve with a varying rate, which is not a continually increasing one, but first decreases and then increases as the spring is deflected in a direction opposite to that of its initial twist, or towards and through a condition in which it is flat. The actual change in load required for successive equal increments of torsional deflection through the range of deflection in which the rate is decreasing may be a plus quantity or a minus quantity, and accordingly the decreasing rate may be positive or negative, with a zero rate at the place of change from positive to negative.

While therefore, the essential characteristic of an initially twisted torsion plate spring is that it has a range of deflection in which its rate first decreases and then increases, it may be so proportioned as to have a varying rate which is always positive, which changes from positive to zero to positive, or which changes from positive to negative to positive.

Corresponding to the foregoing rate changes, the spring resistance to torsional deflection may be a continually increasing one following a sinuous force deflection curve; may increase, remain constant, then increase again; or may increase, decrease, then increase again.

Any or all of the foregoing characteristics of a given spring may be arranged to come within or without the working range of deflection of a particular mechanism as may be desired, and still further modifications of the characteristics may be obtained by arranging for two or more of such spring parts to work in parallel between two relatively pivotable members, with a resultant spring resistance, in any given position of torsional deflection, which is the algebraic sum of the spring resistances of all the spring parts in that position of torsional deflection.

One object of the invention is an initially twisted torsion plate spring having a rate which first decreases and then increases, through a range of its torsional deflection.

Another object of the invention is an initially twisted torsion plate spring so formed and proportioned, that it will have a zero rate, in a range of its torsional deflection.

Another object of the invention is a torsion plate spring interconnecting means between two relatively pivotable members such that the spring resistance to relative pivotal motion of the two members through a range of deflection, continually increases following a sinuous force deflection curve; remains constant; is zero; is positive but diminishes with increasing deflection; or changes from positive to negative with increasing deflection.

Another object of the invention is a plate spring interconnecting means between two relatively movable members, such that there will be no spring resistance to relative pivotal motion of the two members through a limited range of deflection in either direction from a neutral position.

A further object of the invention is a frictionless pivotal connection between two members, permitting relative pivotal motion therebetween, without any torque within a limited twist range of the spring.

The above and other objects of the invention will be apparent as the description proceeds.

According to the invention, torsion plate springs are initially twisted. The initial angle of twist as well as the proportions of the plate are all variables which may be changed as required, to produce a torsion plate spring having the desired characteristics.

It has been found, for instance, that a spring having a zero rate through a considerable but limited range of deflection at and about a position of twisting deflection in which it is flat, is obtained when $$\alpha_0 = \sqrt{3}\frac{lt}{b^2}$$

where $\alpha_0$ = initial angle of twist for $l$ length from flat position
$l$ = length of plate in inches
$t$ = thickness of plate in inches
$b$ = half width of plate in inches A spring with a varying rate which is always positive is obtained with a smaller angle of twist, and a spring with a varying negative rate range is obtained with a greater angle of twist, than that given in the formula above.

Such a spring will exert a finite force in any position of deflection, whatever its rate may be, but when a plurality of initially twisted torsion plate spring parts are arranged as torsion spring interconnecting means in parallel between two relatively pivotable members, with at least two of the spring parts in opposition to each other, and so twisted and disposed with their opposite ends respectively held by the relatively pivotable members, that any relative pivotal motion between the two members will increase the twist of at least one initially twisted spring part, and decrease the twist of at least another of the initially twisted spring parts, the resultant spring resistance may be zero.

The spring parts may have relatively different varying rates and relatively different strengths, and these and the relative extent to which the spring parts are stressed in the initial assembled position in which they are held, may all be varied as required so that the resultant spring resistance to relative pivotal movement of the spring connected members may be made to continuously increase, following a sinuous force deflection curve; to remain constant; zero; positive but diminishing with increasing deflection; or to change from positive to negative with increasing deflection; through a range of deflection. Manifestly there are many instances in which one or another of these characteristics is highly desirable and useful.

There will be friction damping to the extent that there is pressure and relative motion between contacting surfaces of the spring parts, or between the spring parts and their mountings in the relatively movable members. The degree of friction damping may therefore be controlled, and may be made as large or small as may be desired, by varying the proportions and stiffness of the spring parts and/or their number, without otherwise changing the resultant spring characteristics of the combination.

Two such spring parts, each comprising an initially twisted torsion plate spring having an inherent substantially zero rate at and about a position of twisting deflection in which it is flat, with its ends in a common plane, may be arranged as spring interconnecting means between a pair of relatively pivotable members, in such a way that the spring interconnecting means will have no resistance to relative pivotal motion of the two members through a considerable but limited range of deflection in either direction from a neutral position. This result is achieved when the opposite ends of the spring parts are respectively held by the relatively pivotable members, in a common plane, with the spring parts in a flat, stressed condition, in which they oppose each other with oppositely acting balanced reactions, such that any relative pivotal movement of the two members will increase the twist of one initially twisted spring part and decrease the twist of the other initially twisted spring part.

The spring parts may be initially twisted in the same direction, and arranged end to end with their centerlines coaxial, the ends of the spring parts more remote from each other being held by one of the relatively pivotable members, and the adjacent ends being held by the other of the relatively pivotable members; such spring parts may of course, be two portions of a single spring.

Alternatively, the spring parts may be initially twisted in opposite directions and arranged alongside each other, between the relatively pivotable members.

If the centerline of the parts of the spring interconnecting means is coincident with the axis of pivotation of the relatively pivotable members, the spring interconnecting means may be arranged to constitute a frictionless pivotal connection therebetween.

The drawings show various applications of pre-twisted torsion plate springs and spring interconnecting devices according to the invention.

Figure 1:
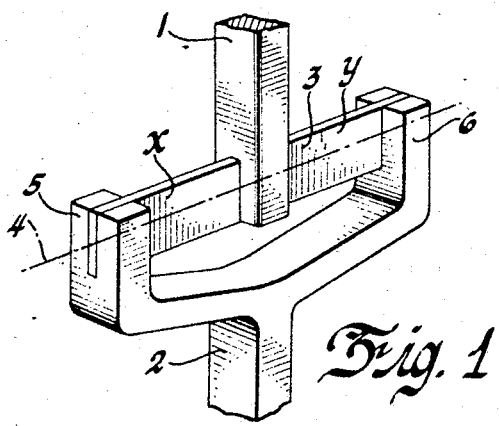
Fig. 1 is a perspective view of an initially twisted torsion plate spring arranged as a frictionless pivot between two members.
Figure 2:
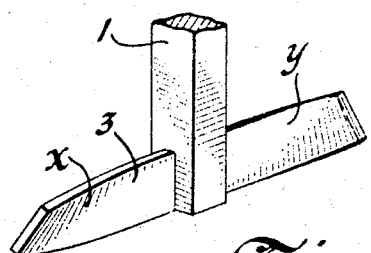
Fig. 2 is a perspective view of the initially twisted spring of Fig. 1, in a condition only partly assembled between the two members.

In Figs. 1 and 2, the relatively pivotable members 1 and 2 are provided with a spring interconnecting means 3.

The spring 3 is an initially twisted torsion plate, and virtually consists of two parts $x$ and $y$ initially twisted in the same direction, having a zero rate at and about a position of twisting deflection in which they are flat, and arranged with their centerlines 4 coaxial.

The member 1 is secured to the spring 3 midway between its opposite ends, which are held in a common plane, with the spring 3 in a flat, stressed condition, by the spaced apart arms 5 and 6 of the member 2. The opposite ends of the parts $x$ and $y$ of the spring are respectively held by the members 1 and 2, so that upon relative pivotal movement of these members about the centerline 4 of the spring, the twist of one initially twisted part $x$ will be increased, and the twist of the other initially twisted part $y$ will be decreased, or vice versa.

Figure 3:
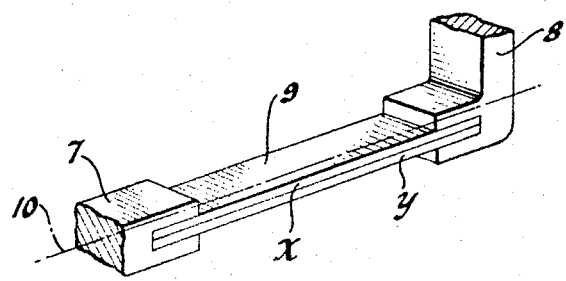
Fig. 3 is a perspective view of a spring interconnecting means, comprising two torsion plate spring parts or laminations initially twisted in opposite directions, and arranged alongside each other between two relatively pivotable members.
Figure 4:
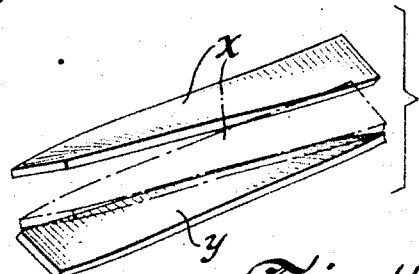
Fig. 4 is an exploded perspective view of the spring interconnecting means of Fig. 3, showing, in full lines, the two initially twisted plate springs before assembly, and in broken lines, the position of one of the plate springs, as it is applied to the other for assembly.

In Figs. 3 and 4, the relatively pivotable members 7 and 8 are provided with a spring interconnecting means 9.

The spring interconnecting means 9 consists of two initially twisted torsion plates arranged alongside each other, and constituting spring parts or laminations $x$ and $y$, each having a zero rate at and about a position of twisting deflection in which they are flat. As shown in Fig. 4, the parts $x$ and $y$ are initially twisted in opposite directions and are assembled between the members 7 and 8 in a flat, stressed condition. As with the arrangement according to Figs. 1 and 2, the twist of one initially twisted part $x$ will be increased, and the twist of the other initially twisted part $y$ will be decreased, or vice versa, upon relative pivotal movement of the two member 7 and 8, about the centerline 10 of the spring interconnecting means.

Figure 5:
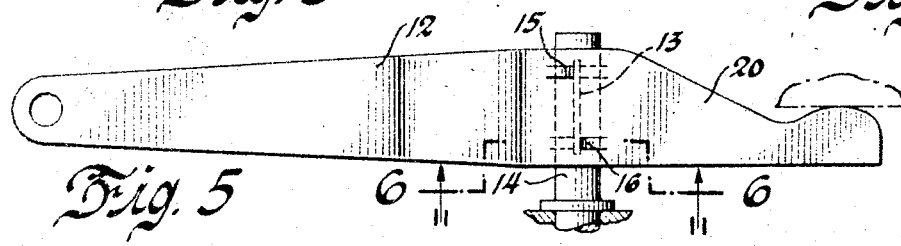
Fig. 5 is a view in elevation of a lever of the first order, having a fulcrum provided by a frictionless pivot of the type shown in Fig. 1.
Figure 6:
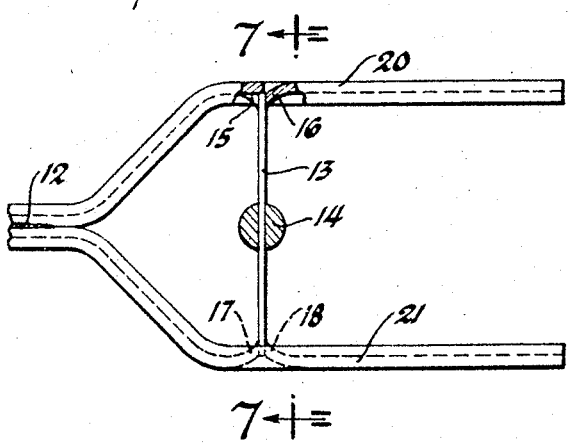
Fig. 6 is a part cut away view on line 6—6 of Fig. 5.
Figure 7:
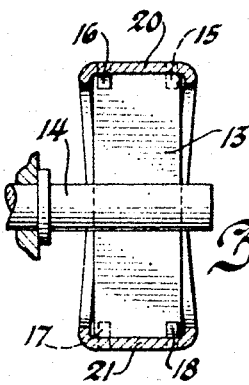
Fig. 7 is a view on line 7—7 of Fig. 6.

Figs. 5, 6 and 7 show a practical application of the arrangement of Figs. 1 and 2, to form a frictionless pivot for a lever 12 which may be a clutch lever, and permitting relative pivotal motion between the lever 12 and its pivot formed by the spring 13, without any torque within a limited twist range of the spring 13.

The spring 13 is held at its middle in a suitable slot in a relatively fixed member 14, and it is held by its ends in a flat, stressed condition, between inturned lugs 15, 16 and 17, 18, in the arms 20 and 21 respectively, of the lever 12.

Figure 8:
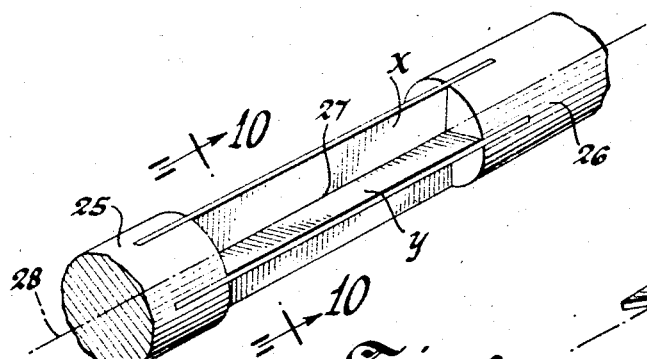
Fig. 8 is a perspective view of a spring interconnecting means comprising two torsion plates with coincidental centerlines and initially twisted in opposite directions, constituting a shaft with an X shaped cross section between two relatively pivotable members.
Figure 9:
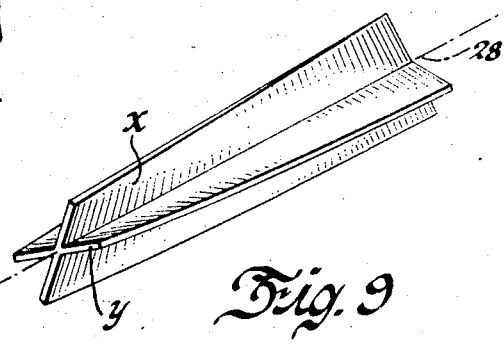
Fig. 9 is a perspective view of the spring interconnecting means of Fig. 8 before assembly between the two relatively pivotable members.
Figure 10:
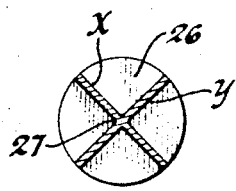
Fig. 10 is a sectional view on line 10—10 of Fig. 8.

In Figs. 8, 9 and 10, the relatively pivotable members 25 and 26 constitute coaxial shaft pieces with spring interconnecting means 27 therebetween, consisting of two spring parts $x$ and $y$ having coincidental centerlines 28, and constituting a shaft with an X-shaped cross section. The two parts $x$ and $y$ are initially twisted in opposite directions as shown in Fig. 9, and have a zero rate at and about a position of twisting deflection in which they are flat.

The spring 27 is assembled with its parts $x$ and $y$ in a flat, stressed condition, and normal to each other (as shown in Fig. 10), between the members 25 and 26 of Fig. 8.

Figure 11:
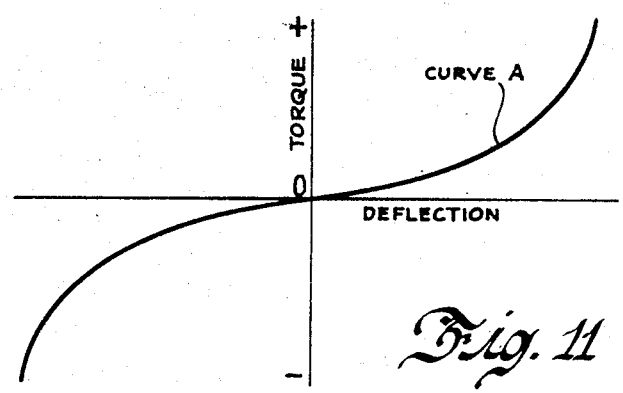
Fig. 11 is a torque deflection curve of an initially flat plate in torsion.

The torque deflection curve A of Fig. 11 shows the varying rate of a typical initially flat plate in torsion.

Figure 12:
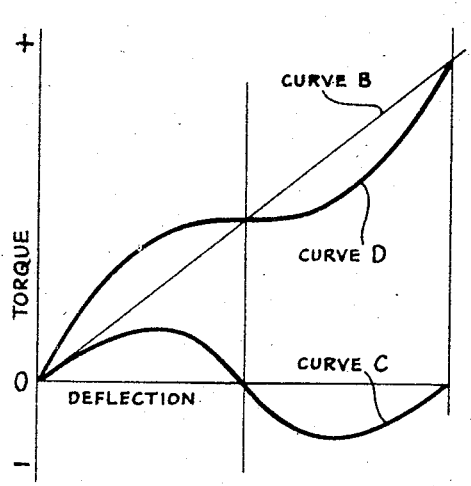
Fig. 12 shows how two force deflection curves of a flat plate spring are combined in an initially twisted torsion plate spring, whose torque deflection curve is their algebraic sum with a zero rate in a limited range of its deflection.

Fig. 12 shows how the resultant torque deflection curve D of an initially twisted plate spring part in torsion is compounded of the plain bending and over center stressing curves B and C respectively. The resultant curve D is the algebraic sum of the ordinates of the plain bending and over center stressing curves B and C, and it will be seen that an initially twisted plate spring of which this curve D is typical, has a zero rate in an intermediate range of its deflection. The curve D is a typical characteristic curve of all the spring parts $x$ and $y$ of all the figures.

Figure 13:
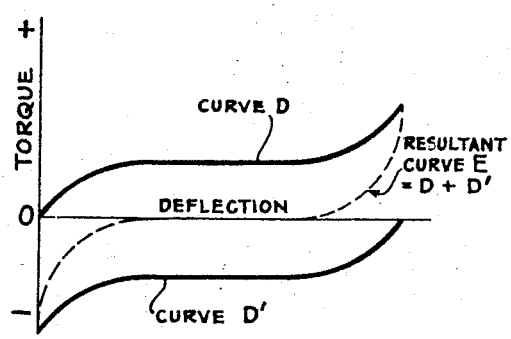
Fig. 13 shows how the torque deflection curves of two spring parts having a zero rate, are combined in a spring means whose torgue deflection curve is their algebraic sum with zero spring force in a limited range of its deflection.

When two such initially twisted plate spring parts $x$ and $y$, having a zero rate, are mounted in opposition to each other, in a flat, stressed condition, with oppositely acting balanced reactions between two members, their torque deflection curves D and D' have the relationship shown in Fig. 13. It will be seen that their resultant torque deflection curve E is the algebraic sum of the ordinates of the curves D and D' and that the spring interconnecting means has no resistance to relative pivotal motion between the two members, within a limited twist range of the spring interconnecting means.

While in all the examples illustrated, the spring interconnecting means consists of two identical initially twisted zero rate plate spring parts in parallel, opposing each other, it will be appreciated that the invention is not limited to such combinations alone, and might consist of two or more initially twisted plate spring parts which may be identical or not, according to the resultant spring characteristics required.

Spring interconnecting means according to the invention as illustrated, or in other suitable arrangements, could obviously be used as frictionless pivotal joints for mounting the weights of centrifugal speed governors, for pedal bearings, mounting blades of variable pitch propellers, valve rocker arm bearings, suspension spring hangers, universal joint pivots, weighing scale pivots, flexible couplings, etc. For instance, the example of Figs. 3 and 4 could well be a flexible shaft or coupling, with friction damping to the extent that there is pressure and relative movement between the parts, while a construction like that of Figs. 8 to 10 would be suitable as a propeller shaft, of increased flexibility to reduce harshness; along with a low rate for ordinary driving conditions, it could have the advantage of a high rate to limit the maximum windup under heavy torque.

I claim:

1. A torsion plate spring formed with an initial twist such that it has a helical surface in its unstressed condition, said torsion plate spring thereby having a varying rate which first decreases and then increases, through a range of its torsional deflection, opposite to that of its initial twist.

2. A spring according to claim 1, the initial angle of twist for a given length of the spring being such that it has a varying rate which is always positive.

3. A spring according to claim 1, the initial angle of twist for a given length of the spring being such that it has a varying rate including positive and zero rate ranges.

4. A spring according to claim 1, the initial angle of twist for a given length of the spring being such that it has a varying rate including positive and negative rate ranges.

5. In combination a pair of relatively movable members, and torsion spring interconnecting means therebetween permitting a degree of pivotal motion of the two members relatively to each other, said torsion spring interconnecting means comprising a plurality of initially twisted torsion plate spring parts each having opposite ends respectively held by the relatively movable members; said spring parts being so disposed and mounted between the relatively movable members, that any relative pivotal motion thereof, will twist at least one initially twisted spring part in the direction of its initial twist, and twist at least another of the initially twisted spring parts in a direction opposite to that of its initial twist, the resultant spring resistance of said spring interconnecting means in any given position of torsional deflection, being the algebraic sum of the spring resistances of all the spring parts, in that position of torsional deflection.

6. The combination according to claim 5, in which at least two of said spring parts are initially assembled and held by the relatively movable members, in an initially stressed condition in which they have oppositely acting balanced reactions on the relatively movable members.

7. The combination according to claim 5, in which the resultant spring resistance to relative pivotal movement of the two members continuously increases, through a range of deflection of the two members relatively to each other.

8. The combination according to claim 5, in which the resultant spring resistance to relative pivotal movement of the two members remains constant through a range of deflection of the two members relatively to each other.

9. The combination according to claim 5, in which the resultant spring resistance to relative pivotal movement of the two members is zero through a range of deflection of the two members relatively to each other.

10. The combination according to claim 5, in which the resultant spring resistance to relative pivotal movement of the two members is positive but diminishes through a range of increasing deflection of the two members relatively to each other.

11. The combination according to claim 5, in which the resultant spring resistance to relative pivotal movement of the two members changes from positive to negative through a range of increasing deflection of the two members relatively to each other.

12. In combination a pair of relatively movable members and spring interconnecting means therebetween permitting a degree of pivotal motion of the two members relative to each other, said spring means consisting of two parts each comprising an initially twisted torsion plate spring having an inherent substantially zero rate at and about a position of twisting deflection in which it is flat with its ends in a common plane, each of said parts having opposite ends respectively held by the relatively movable members in a common plane with the said parts in a flat, stressed, condition with oppositely acting balanced reactions, whereby the opposite ends of said parts will be twisted in opposite directions by relativ pivotal movement of the said members and thereby one initially twisted part will be twisted in the direction of its initial twist, and the other initially twisted part will be twisted in a direction opposite to that of its initial twist, and there will be no spring resistance to relative pivotal motion of the two members through a limited range of deflection in either direction from a neutral position.

13. The combination according to claim 12, in which the two parts of said spring means are initially twisted in the same direction and are arranged with their centerlines coaxial between the two members; the ends of said parts more remote from each other being held in a common plane by one of the members, and the adjacent ends of said parts being held in the same common plane by the other of the said members.

14. The combination according to claim 12, in which the two parts of said spring means are initially twisted in the same direction and are arranged with their centerlines coaxial between the two members, and constitute a single initially twisted torsion plate spring having opposite ends held in a common plane by one of the members, the other member being secured to the spring midway between its opposite ends.

15. The combination according to claim 12, in which the two parts of said spring means are initially twisted in the same direction and are arranged with their centerlines coaxial between the two members and coaxial with the axis of the pivotation of the two members, and constitute a single initially twisted torsion plate spring having opposite ends held in a common plane by one of the members, the other member being secured to the spring midway between its opposite ends, whereby said spring constitutes a frictionless pivot permitting relative pivotal motion between the two members without any torque within a limited twist range of the spring.

16. The combination according to claim 12, in which the two parts of said spring means are arranged alongside each other between the two members and are initially twisted in opposite directions.

17. The combination according to claim 12, in which the two parts of said spring means are initially twisted in opposite directions, have coincidental centerlines, and constitute a shaft with an X shaped cross section.

18. The combination according to claim 12, in which the two parts of said spring means are initially twisted in opposite directions and are arranged alongside each other, to constitute two laminations of a spring interconnecting means between the two members, the center line of the spring interconnecting means being coincident with the axis of pivotation of the two members, whereby said spring interconnecting means constitutes a frictionless pivot permitting relative pivotal motion between the two members without any spring resistance within a limited twist range of the spring interconnecting means.

19. A torsion plate spring formed with an initial twist such that it has a helical surface in its unstressed condition, said torsion plate spring thereby having a varying rate, the initial angle of twist for a given length of the spring being such that it has a substantially zero rate through a part of its range of torsional deflection.

JOHN O. ALMEN.